Feb. 3, 1925.
A. WITT
1,525,057
COMBINED CLUTCH ACTUATOR AND BRAKE
Filed April 7, 1923
2 Sheets-Sheet 1
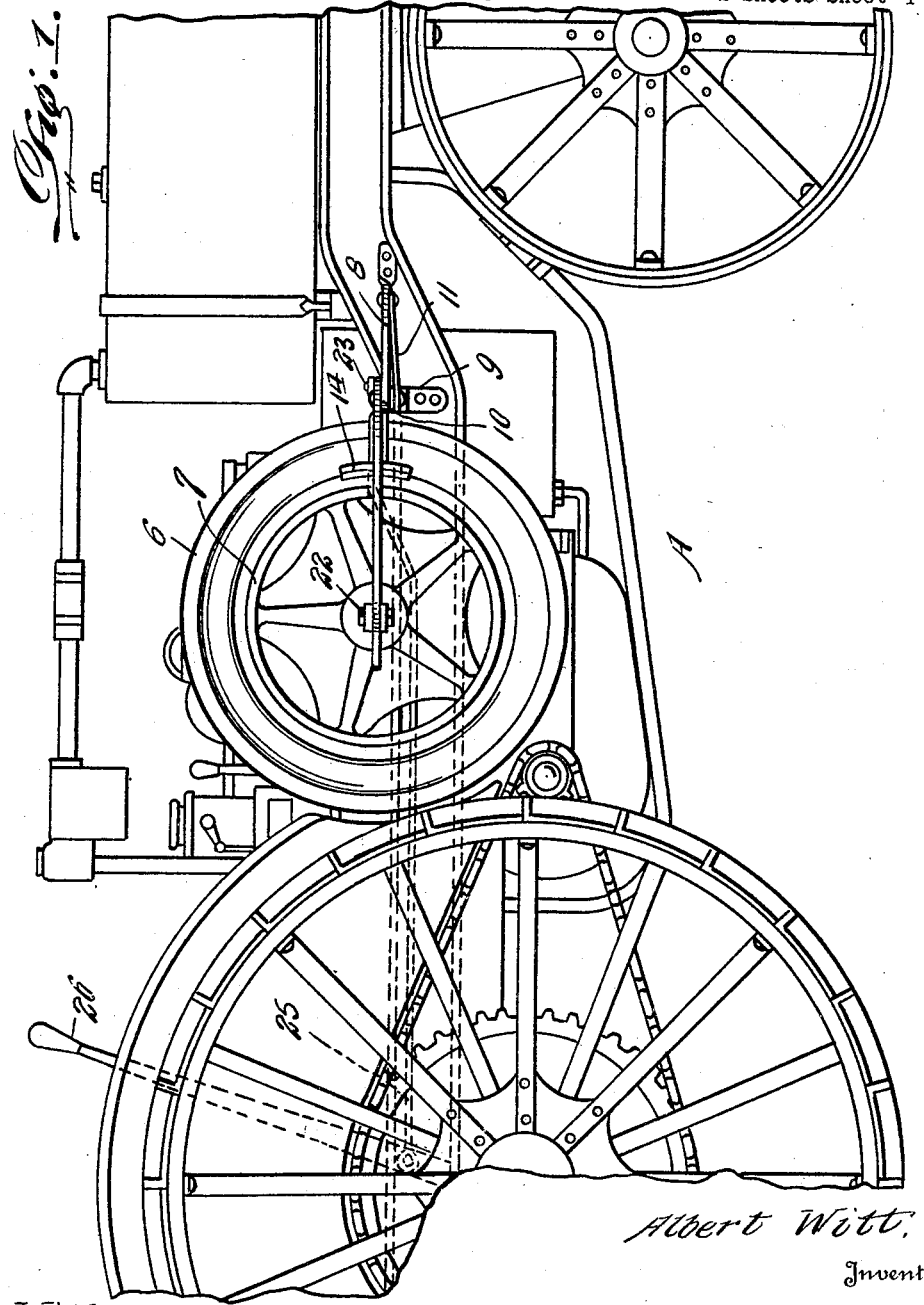
Albert Witt,
Inventor

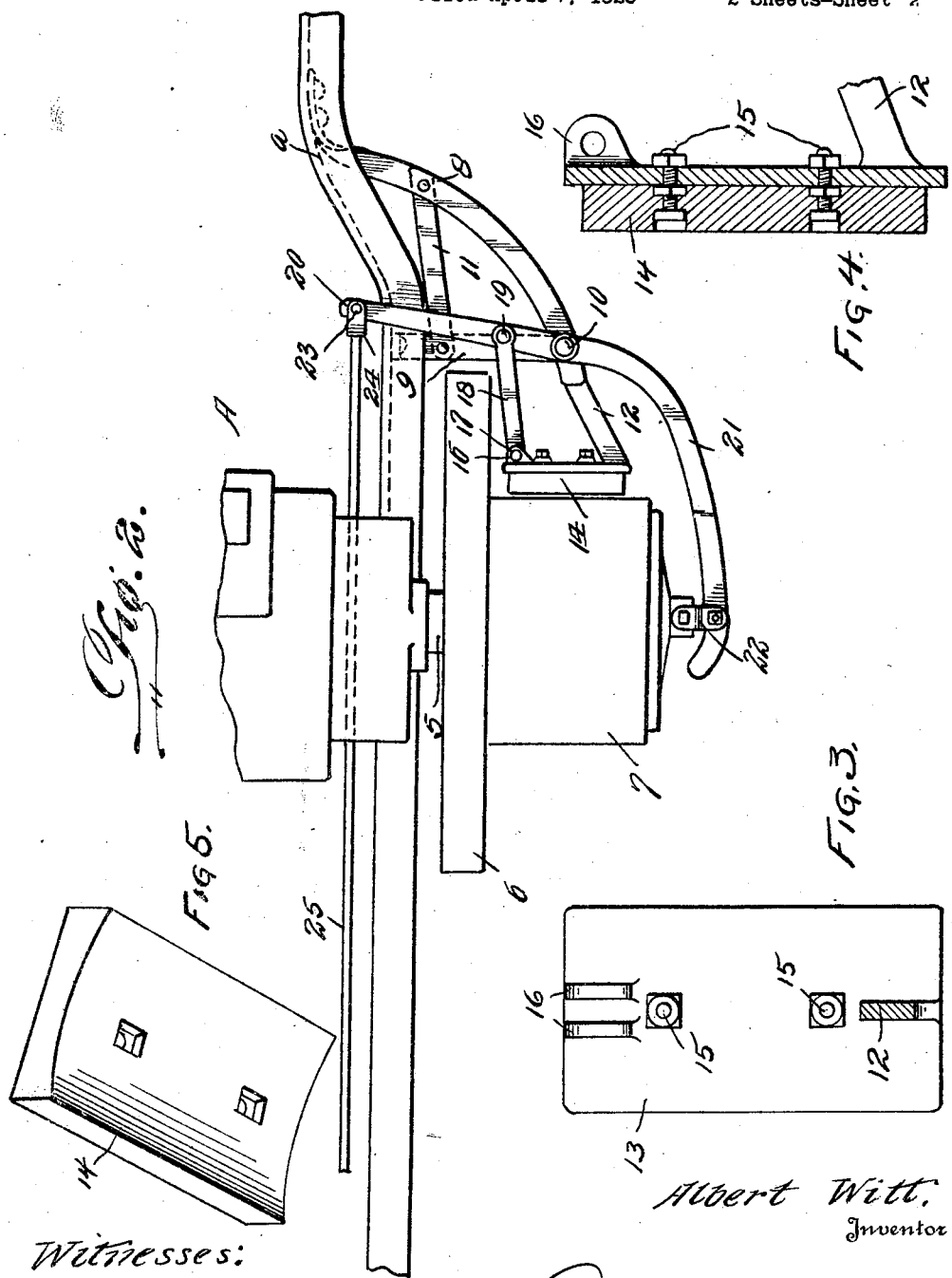

Patented Feb. 3, 1925.

1,525,057

UNITED STATES PATENT OFFICE.

ALBERT WITT, OF HUMBOLDT, SASKATCHEWAN, CANADA.

COMBINED CLUTCH ACTUATOR AND BRAKE.

Application filed April 7, 1923. Serial No. 630,656.

*To all whom it may concern:*

Be it known that ALBERT WITT, a subject of the King of England, residing at Humboldt, in the Province of Saskatchewan and Dominion of Canada, has invented certain new and useful Improvements in Combined Clutch Actuators and Brakes, of which the following is a specification.

The main purpose of my invention resides in the provision of a combined clutch actuator and brake especially adapted for application to tractors of the "Titan" type whereby the usual power take off pulley provided upon side projecting power shafts of this type of tractor may be suitably clutched and unclutched from the shaft, and at the same time, motion of the pulley absolutely stopped as soon as the same is unclutched from the shaft.

A further purpose of the invention is the provision of such a device that may be readily applied to this type of tractor in a novel manner and without, to any great extent, requiring a change to the power take off shaft and its pulley.

A still further object of the invention resides in the provision of a combined clutch actuator and brake, wherein the same is of simple construction, substantial, inexpensive to manufacture and highly useful of purpose.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:

Figure 1 is a fragmentary side elevational view of a "Titan" tractor, showing my combined clutch actuator and brake associated therewith;

Figure 2 is a top plan view of my device showing the same in proper position upon the tractor;

Figure 3 is a rear elevational view of the brake shoe carrying plate forming a component part of the present invention;

Figure 4 is a vertical longitudinal cross sectional view of the brake shoe and its carrying plate; and Figure 5 is a perspective of the brake shoe per se.

Referring to the drawings in detail, there is shown a tractor A of the "Titan" type having the usual side projecting power take off shaft 5 upon which is keyed or otherwise suitably secured a fly wheel 6. Also upon this shaft is the belt pulley 7 that is adapted to be operatively connected thereto by the usual clutch mechanism, not shown.

Bolted or otherwise suitably secured to the channel iron *a* of the tractor frame and at a point thereon substantially as shown in Figures 1 and 2 is a downwardly and rearwardly extending supporting arm 8, the free end of which terminates forwardly of the said belt pulley 7. Also bolted or otherwise suitably secured to the said channel iron *a* of the tractor frame and at a point between the bolted end of the said arm 8 and the belt pulley 7 is a laterally extending arm 9, the same being connected at its free end to a point adjacent the free end of the said arm 8 as at 10. Between the arms 8 and 9 is a connecting rod 11. Pivoted adjacent the end of said downwardly and rearwardly extending arm 8 through the instrumentality of the said connection 10 is a forwardly directed arm 12 formed upon one end of a brake shoe carrying plate 13, Figures 3 and 4. Bolted to the front face of this plate 13 is a brake shoe 14, the bolt connections 15 between the said shoe and plate being countersunk within the shoe as more clearly shown in Figure 4. The normal position of the brake shoe 14 is slightly spaced from the belt pulley 7 as clearly shown in Figures 1 and 2 of the drawings.

Formed upon the end of the said brake shoe carrying plate 13 opposite from the said forwardly directed arm 12 is a pair of spaced ears 16 and pivotally secured as at 17 between these ears is a forwardly extending connecting link 18, this link being pivoted as at 19 to a lever 20 which is pivotally secured to said outwardly and rearwardly extending arm 8 at the connection 10. One end of this lever 20 terminates in a rearward extension 21 and connected through the instrumentality of a link 22 to this rearward extension is the before mentioned clutch mechanism between the shaft 5 and pulley 7, it being at once apparent that when the said lever 20 is swung upon the pivot 10 the pulley 7 will be unclutched from the power take off shaft 5 and incidental with this movement the brake shoe will be forced into face to face contact with the said belt pulley 7 and consequently stop the rotation thereof.

Pivotally secured at 23 to the opposite end of the said lever 20 is the forked end 24 of a rearwardly directed rod 25, the same being pivotally connected at its opposite end to a hand lever 26 whereby when this hand lever is moved in opposite directions my combined clutch and braking mechanism will be actuated.

In view of the above description it will be at once apparent that I have provided an effectual means for clutching and unclutching the usual pulley of a power take off shaft of the "Titan" type of tractor as well as the effectual means for stopping the rotation of these pulleys immediately upon the clutching of the same from their shafts and although I have herein shown and described the most practical embodiment of my invention, it is nevertheless to be understood that minor changes may be made therein without departing from the spirit and scope of the invention as claimed.

Having thus described my invention, what I claim as new and desire to secure by Letters Patent is:

The combination with a tractor frame having a clutch controlled engine driven pulley spaced outwardly from one side of its side bars, of a rigid frame secured to and extending laterally from said tractor frame, a bell crank lever fulcrumed on said laterally extending frame and having one arm connected with the pulley clutch, a brake shoe disposed transversely of the pulley and provided at one end with a fixed arm which is pivotally connected with the laterally extending frame at the same point at which the bell crank lever is pivoted thereon, and a link pivotally connected at one end with the other end of the brake shoe and pivotally connected at its other end with the intermediate portion of the bell crank lever.

In testimony whereof I affix my signature.

ALBERT WITT.